United States Patent [19]
Stainton et al.

[11] Patent Number: 5,157,607
[45] Date of Patent: Oct. 20, 1992

[54] CONTROL AND METHOD FOR CONTROLLING AMT SYSTEM INCLUDING IN-GEAR FAULT DETECTION AND TOLERANCE

[75] Inventors: John E. Stainton, Chorley; Keith Wright, Preston, both of England

[73] Assignee: Eaton Corporation, Cleveland, Ohio

[21] Appl. No.: 641,207

[22] Filed: Jan. 15, 1991

[30] Foreign Application Priority Data

Jan. 19, 1990 [GB] United Kingdom ............... 9001273

[51] Int. Cl.$^5$ ............................................. B60K 41/06
[52] U.S. Cl. ................................................ 364/424.1
[58] Field of Search ............ 364/424.1, 431.11, 424.03; 74/866, 843, 856

[56] References Cited

U.S. PATENT DOCUMENTS

| | | | |
|---|---|---|---|
| 4,702,127 | 10/1987 | Cote | 364/424.1 X |
| 4,843,551 | 6/1989 | Milunas | 364/424.1 |
| 4,945,484 | 7/1990 | Cote et al. | 364/424.1 |
| 4,955,258 | 9/1990 | Ito et al. | 364/424.1 X |
| 5,005,687 | 4/1991 | Kurihara et al. | 364/424.1 X |

Primary Examiner—Parshotam S. Lall
Assistant Examiner—E. J. Pipala
Attorney, Agent, or Firm—H. D. Gordon

[57] ABSTRACT

A method and control for controlling an AMT system (10) having input shaft (IS) and output shaft (OS) speed sensors is provided including sensing faulty determinations of transmission engagement in a known gear ratio (GR).

4 Claims, 2 Drawing Sheets

CONTROL AND METHOD FOR CONTROLLING AMT SYSTEM INCLUDING IN-GEAR FAULT DETECTION AND TOLERANCE

BACKGROUND OF THE INVENTION

1. Field of the Invention

This invention relates to automatic/semiautomatic power transmissions providing a plurality of gear reduction ratios, such as automatic/semi-automatic mechanical transmissions (i.e. "AMTs"), and, to control systems and methods therefor. In particular, the present invention relates to control systems and methods for automatic/semi-automatic mechanical transmission systems wherein gear selection and shift decisions are made and/or executed based upon measured and/or calculated parameters such as vehicle or transmission output shaft speed, transmission input shaft speed, engine speed, throttle position, rate of change of throttle position, rate of change of vehicle and/or engine speed and the like. More particularly, the present invention relates to a control and method for controlling an AMT system including detection of in-gear faults (i.e. transmission not engaged or engaged in a ratio other than the ratio indicated by control logic) and tolerance thereto.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like, are known in the prior art. Examples of such automatic/semi-automatic transmission control systems for vehicles may be seen by reference to U.S. Pat. Nos. 4,361,060; 4,595,986; 4,576,065; 4,648,290; 4,569,255; 4,551,802; 4,527,447; 4,425,620; 4,463,427; 4,081,065; 4,073,203; 4,253,348; 4,038,889; 4,226,295; 3,776,048; 4,208,929; 4,039,061; 3,974,720; 3,478,851 and 3,942,393, the disclosures of which are all hereby incorporated by reference.

Automatic control systems/subsystems for automatically controlling the engagement and disengagement of AMT system vehicle master clutches, especially during vehicle start from stop operations, are known in the prior art as may be seen by reference to U.S. Pat. Nos. 4,081,065; 4,401,200; 4,413,714; 4,432,445, 4,509,625 and 4,576,263, the disclosures of all of which are hereby incorporated by reference.

While the above referenced automatic/semiautomatic transmission control systems, especially the systems illustrated in U.S. Pat. Nos. 4,081,065; 4,361,060; 4,595,986; 4,576,065; 4,569,255 4,648,290; and 4,576,263, and similar systems, are effective to control the vehicle automatic/semiautomatic transmission system operations under most conditions, under certain conditions, the logic did not accurately sense an unintended out of gear or incorrect gear engaged condition and/or did not provide adequate response to such conditions.

In particular, upon commanding engagement of a particular selected gear ratio in an automatic/semi-automatic multiple speed mechanical transmission, verification of actual engagement is often a matter of sensing actuation of a particular solenoid or set of solenoids, sensing axial movement of a particular shift rail, shift piston or shift fork, or the like.

Due to the possibility of faulty position sensors, excessive deformation or clearance in, or failure of, a portion of the shift linkages, and the like, it was not possible to sense with the desired degree of certainty when a selected gear ratio did not achieve initial engagement or, due to drive line conditions, "fell out of gear". Not being engaged in the selected gear ratio, or at least one of the gear ratios, can be a very undesirable condition, especially in a heavy duty truck traveling down hill.

SUMMARY OF THE INVENTION

In accordance with the present invention, the drawbacks of the prior art have been overcome or minimized by providing a control system, preferably an electronic control system, and control method for automatic/-semi-automatic, mechanical transmission systems wherein gear selection and shift decisions, are made and/or executed based upon measured and/or calculated parameters including at least input signals indicative of currently engaged gear ratio, vehicle speed and transmission input shaft speed. Other inputs/parameters, such as signals indicative of the engine speed, throttle position, rate of change of throttle position, condition of the master clutch, and the like, may also be utilized to make decision for control of the AMT system.

The various input signals are processed to provide an indication of a faulty in-gear signal and/or controller determination of an in-gear condition and to provide logic rules for operation of the transmission in tolerance of such a faulty in-gear indication.

Briefly, a faulty in-gear condition is considered to exist if the automatically or semi-automatically controlled transmission is not engaged, or is not engaged in the specific gear ratio selected by the control logic, at a time when various sensors indicate engagement in the selected ratio and/or the control logic has determined that the transmission is engaged in the selected gear ratio. Therefore, if, based upon sensed inputs, the system controller has determined that the controlled transmission system is fully engaged in seventh gear when, in fact, the transmission is not engaged, or is engaged in sixth or fifth or eighth gear, a faulty controller determination of an in-gear condition exists.

The above is accomplished by providing a transmission control system including a central processing unit generating shift patterns (i.e., shift points) based upon sensed or calculated parameters processed by a central processing unit in accordance with predetermined logic rules or programs. The predetermined logic rules or programs by which the various input signals are processed include a subroutine which confirms that a controller determined in-gear condition is true, or if not true, provides for a set of logic rules to determine the existing engagement state of the controlled transmission and provides a set of commands to best control the transmission in tolerance of the sensed faulty in-gear determination.

The above is accomplished by, if the vehicle is in motion (i.e. output shaft speed, OS, greater than a reference) and the transmission is assumed to be engaged in a known gear ratio (GR), the input shaft (IS) and output shaft (OS) speeds are measured and the relationship IS=OS*GR is evaluated. If IS=OS*GR, within accepted tolerance values, the in-gear determination is considered to be true. If IS=OS*GR is not true, then either (i) the controlled transmission is not engaged, or (ii) the controlled transmission is not engaged in the correct ratio.

While both of the above conditions are faults, an out of gear condition is considered to be of more concern. Upon sensing the IS does not equal OS*GR, the logic will determine if a close gear (i.e. GR±1 or GR ±2) is engaged by sensing if IS=OS*(GR±1) or IS=OS*(GR±2) is true. If true, the transmission is prohibited from further shifting and the operator is informed of a system fault.

If an adjacent ratio is not engaged, the transmission is considered to be out-of-gear, i.e., not engaged, and the highest priority is to engage the transmission in an allowable ratio. To accomplish this, OS (possibly modified by sensed rate of change of OS) is multiplied by (GR+N) which is the gear ratio in GR and the ratios higher and lower than GR to find a target gear ratio ($GR_T$) wherein OS X $GR_T$ equals an allowable engine speed. Upon achieving engagement in the target gear ratio, $GR_T$, further shifting is prohibited and the operator is informed of the system fault.

Accordingly, it is an object of the present invention to provide a new and improved control and control method for an automatic/semi-automatic mechanical transmission system including sensing faulty determination of an in-gear condition and providing commands for operation in tolerance of such sensed faulty determinations.

This and other objects and advantages of the present invention will become apparent from a reading of the description of the preferred embodiment taken in connection with the attached drawings.

DESCRIPTION OF THE PREFERRED EMBODIMENT

Figure 1:
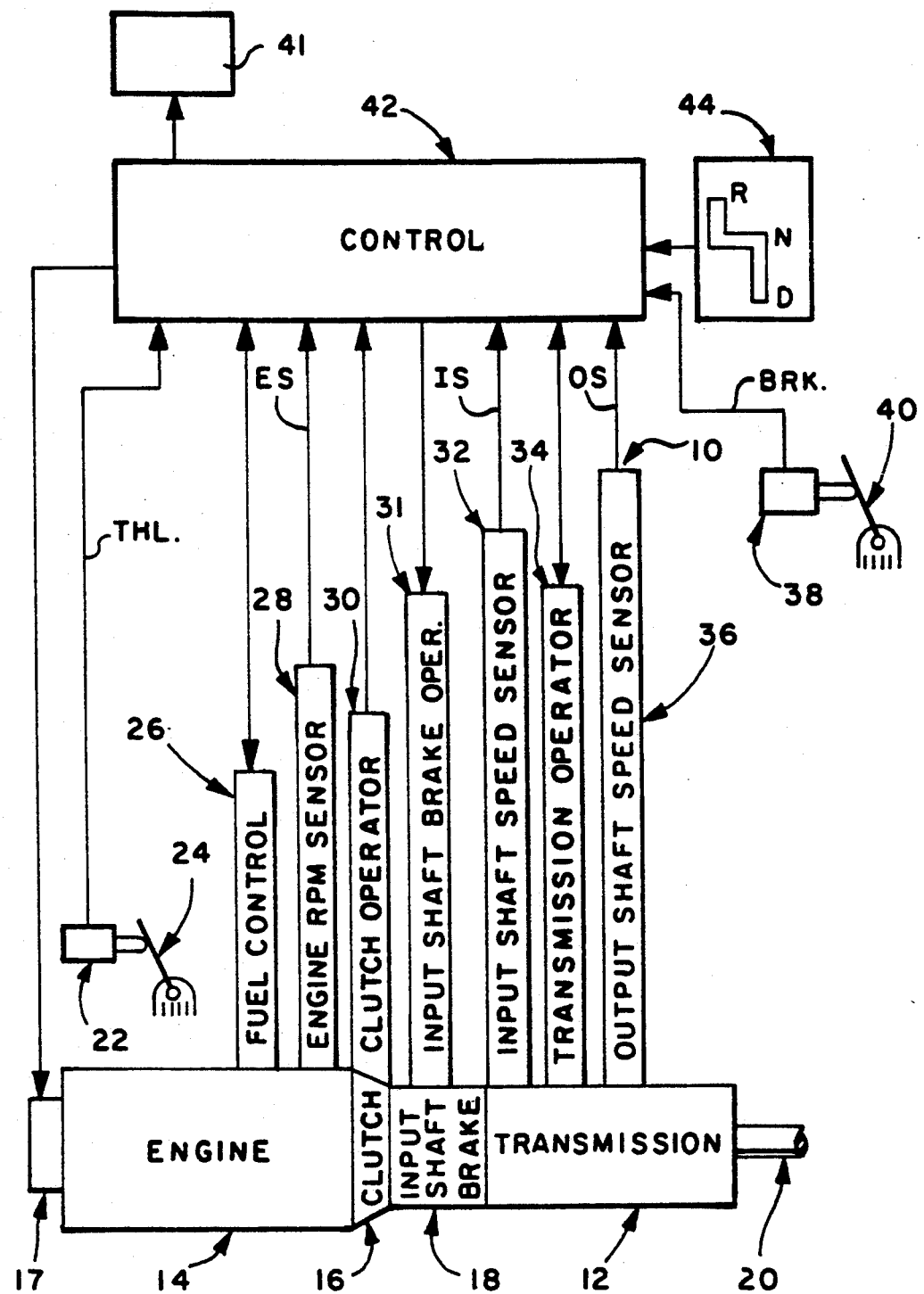
FIG. 1 is a schematic illustration of the components and interconnections of the automatic mechanical transmission control system of the present invention.

FIG. 1 schematically illustrates an automatic mechanical transmission system 10 including an automatic multi-speed compound change gear transmission 12 driven by a throttle control engine 14, such as a well known diesel engine, through a master friction clutch 16. An engine compression brake, such as an exhaust brake 17, for retarding the rotation speed of engine 14 and/or an input shaft brake 18, which is effective to apply a retarding force to the transmission input shaft upon disengagement of master clutch 16, may be provided as is well known in the art. The output of automatic transmission 12 is output shaft 20 which is adapted for driving connection to an appropriate vehicle component such as the differential of a drive axle, a transfer case, or the like, as is well known in the prior art.

Exhaust brakes, also known as engine compression brakes, such as the well known "Jake Brake" are well known in the heavy-duty truck industry.

The above-mentioned power train components are acted upon and/or monitored by several devices, each of which will be discussed in greater detail below. These devices include a throttle position or throttle opening monitor assembly 22, which senses the position of the operator control vehicle throttle or other fuel throttling device 24, a fuel control device 26 for controlling the amount of fuel to be supplied to the engine 14, on engine speed sensor 28 which senses the rotational speed (ES) of the engine 14, a clutch operator 30 which engages and disengages clutch 16, and which may also supply information as to the status of the clutch, an input shaft brake operator 31, a transmission operator 34, which is effective to shift the transmission 12 into a selected gear ratio and preferably to provide a signal indicative of the currently engaged ratio, a transmission input shaft (IS) speed sensor 32 and a transmission output shaft (OS) speed sensor 36. A vehicle brake monitor 38 senses actuation of the vehicle brake pedal 40. A fault indicator 41 for indication of the occurrence and/or identify of a system fault may also be provided.

The above-mentioned devices supply information to and/or except commands from a central processing unit or control 42. The central processing unit 42 may include analog and/or digital electronic calculation and logic circuitry, the specific configuration and structure of which circuitry forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provide electrical and/or pneumatic power to the various sensing, operating and/or processing units. Drive train components and controls therefor of the type described above are known in the prior art and may be appreciated in greater detail by reference to above-mentioned U.S. Pat. Nos. 4,595,986; 4,576,065; 4,569,255; 4,361,060; 4,226,295; 4,038,889 and 3,776,048.

Sensors 22, 28, 32, 36, 38 and 44 may be of any known type or construction for generating analog or digital signals proportional to and/or indicative of the parameter monitored thereby. Similarly, operators 17, 18, 26, 30 and 34 may be of any known electrical, pneumatic or electro-pneumatic type for executing operations in response to command signals on processing unit 42. Fuel control 26 will normally supply fuel to engine 14 in accordance with the operator setting of throttle 24, but may supply a lessor (fuel dip) or greater (fuel boost) amount of fuel in accordance with commands from control unit 42.

In addition to the above-mentioned direct inputs, the central processing unit 42 may be provided with circuitry and/or logic routines for differentiating the input signals from sensors 28 and/or 36 to provide calculated signals indicative of the rate of acceleration of the engine and/or vehicle, means to compare the input signals from sensors 31 and 36 to calculate a currently engaged gear ratio, means to compare the current engaged gear ratio with the signal from sensor 36 to provide a calculated engine speed, means to sense full throttle and means to differentiate the signal from sensor 22 to calculate the rate of change of the throttle position sensor.

The central processing unit 42 may also comprise a memory means for storing certain input and/or calculated information and means for clearing the memory means upon the occurrence of a predetermined event. The memory means incorporated into the central processing unit 42 may store information such as the direction of the last shift (i.e. upshift or downshift), position of a throttle, rate of change of throttle position, vehicle speed or the like. The memory means may be reset upon the occurrence of a specified event, such as engine or vehicle speed being less than and of greater than a predetermined limit or limits, full application of a throttle, operator throttle setting exceeding a predetermined limit, the occurrence of a gear change, etc.

It is understood that, given a known drive train, output speed and vehicle speed are related in a known manner. Also, assuming a fully engaged master clutch 16, input shaft speed and engine speed are equal and signals indicating any two of the input shaft/engine speed, currently engaged gear ratio and output shaft/vehicle speed is sufficient to specify all three parameters.

The purpose of the central processing unit 42 is to select, in accordance with a program (i.e. predetermined logic rules) and current and stored parameters, the optimal gear ratio at which the transmission 12 should be operating and, if necessary, to command a gear change, or shift, into the selected optimal gear ratio. Ideally, decisions by the central processing unit 42 as to the proper gear ratio that should be selected and engaged, are based upon accurate sensing and/or predicting of current operating conditions and driver demands.

In an automatically controlled mechanical transmission, gear ratios are engaged by means of positive jaw clutches which are axially positioned by shift forks carried by shift rails or the like. Under certain conditions an in-gear condition is often confirmed by the controller on the basis of sensed positioning of the shift rails/shift forks or the condition of other actuators.

In the event that one or more of the sensors is faulty and/or the shift rails are deformed or otherwise damaged, the controller may falsely detect an in-gear condition and may take correspondingly inappropriate action in reliance thereon. For example, a gear may "fall out of engagement" as a jaw clutch moves out of positive engagement resiliently deforming a shift fork. Unless a continuous check is made based upon sensed shaft speed values to confirm the in-gear condition, such a situation may not be sensed by relying solely on position sensors.

Accordingly, the AMT control of the present invention utilizes a subroutine which confirms that a controller determined in-gear condition is true, or if not true provides for a set of logic rules to determine the existing engagement state of the controlled transmission and provides a set of commands to best control the transmission in tolerance of the sensed faulty in-gear determination.

Preferably, as indicated in above-mentioned U.S. Pat. No. 4,595,986, the algorythm of which the subroutine is a part will be performed at least one, preferably at least twice, within the period of time required for the actuators (26, 30, 34) to respond to a command output signal.

Figure 2:
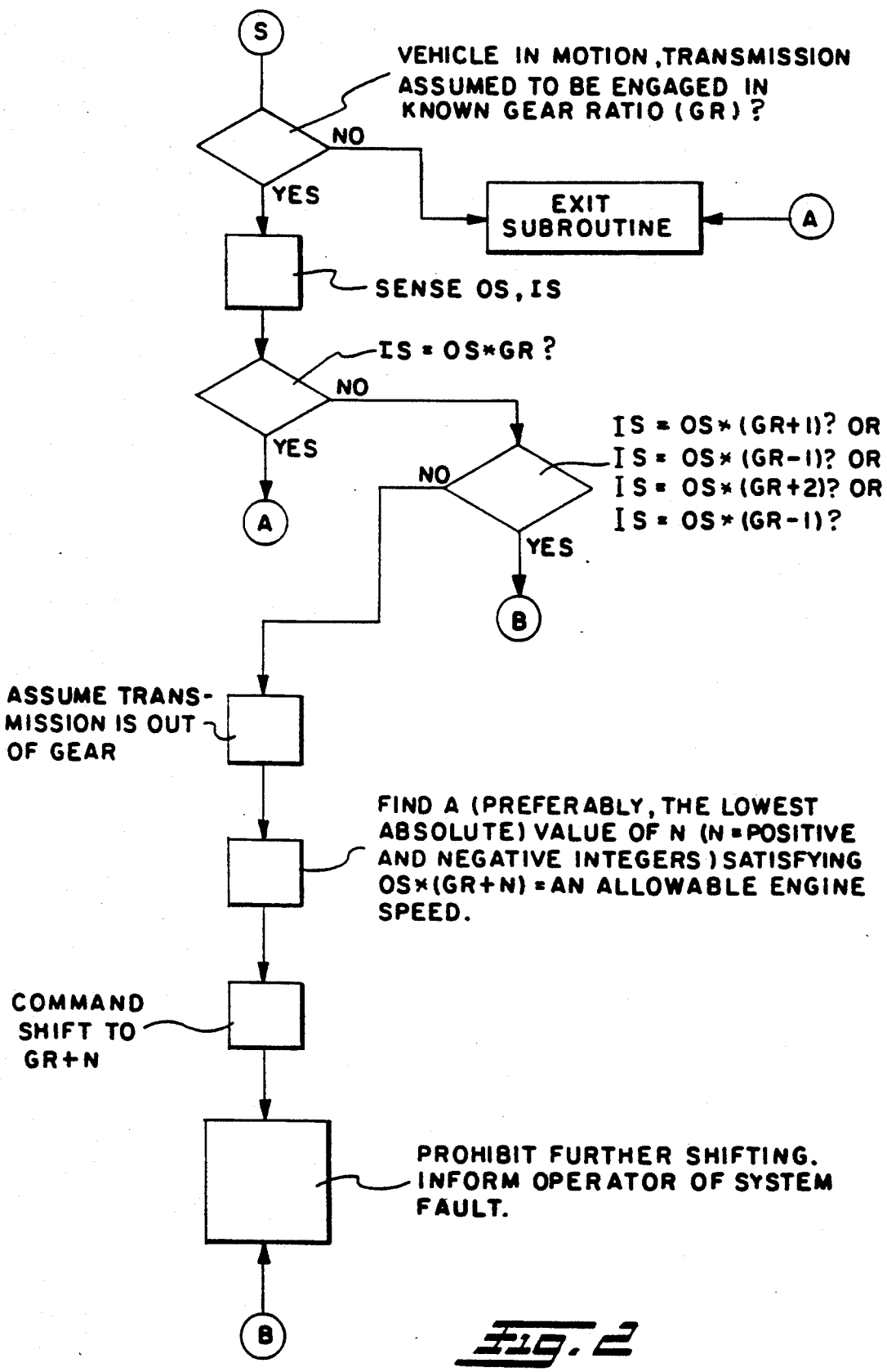
FIG. 2 is a symbolic illustration, in the form of a flow chart, illustrating the preferred manner of practicing the method of the present invention.

As may be seen by reference to FIG. 2, if the vehicle is in motion (i.e. output shaft speed, OS, greater than a reference) and the transmission is assumed to be engaged in a known gear ratio (GR), the input shaft (IS) and output shaft (OS) speeds are measured and the relationship $IS = OS*GR$ is evaluated. If $IS = OS*GR$, within accepted tolerance values, the in-gear determination is considered to be true. If $IS = OS*GR$ is not true, then either (i) the controlled transmission is not engaged, or (ii) the controlled transmission is not engaged in the correct ratio.

While both of the above conditions are faults, an out of gear condition is considered to be of more concern. Upon sensing the IS does not equal OS*GR, the logic will determine if a close gear (i.e. $GR \pm 1$ or $GR \pm 2$) is engaged by sensing if $IS = OS*(GR \pm 1)$ or $IS = OS*(GR \pm 2)$ is true. If true, the transmission is prohibited from further shifting and the operator is informed of a system fault.

If an adjacent ratio is not engaged, the transmission is considered to be out-of-gear, i.e., not engaged, and the highest priority is to engage the transmission in an allowable ratio. To accomplish this, OS (possibly modified by sensed rate of change of OS) is multiplied by $(GR+N)$ which is the gear ratio in GR and the ratios higher and lower than GR to find a target gear ratio ($GR_T$) wherein OS X $GR_T$ equals an allowable engine speed. Upon achieving engagement in the target gear ratio, $GR_T$, further shifting is prohibited and the operator is informed of the system fault.

Accordingly, it may be seen that by the control, and the control method, of the present invention, predetermined logic rules are provided allowing the central processing unit 42 of an AMT system 10 to process available input parameters to determine if a faulty in-gear determination condition exists, and, if such a condition is sensed, to command appropriate actions in view of the condition.

Although the present invention has been set forth with a certain degree of particularity, it is understood that various modifications are possible without departing from the spirit and the scope of the invention as hereinafter claimed.

We claim:

1. A method for controlling a vehicle automated mechanical transmission system for devices having an operator actuated throttle, a throttle-controlled engine, a transmission having a plurality of gear ratio combinations selectively engagable between a transmission input shaft and a transmission output shaft, said transmission input shaft being operatively connected to said engine by means of a selectably engagable and disengagable friction coupling, said automatic mechanical transmission system including an information processing unit (42) having means for receiving a plurality of input signals including (i) an input signal (OS) indicative of output shaft speed, (ii) an input signal independent of said shaft speed and (iii) an input signal independent of said shaft speed signals indicative of a currently engaged gear ratio; said processing unit including means for processing said input signals in accordance with a program for generating output signals whereby said transmission system is operated in accordance with said program, and means associated with said transmission system effective to actuate said transmission (34) to effect engagement of one (GR) of said gear ratio combinations in response to said output signals, said method characterized by:

if the output shaft speed (OS) is greater than a predetermined reference and if the processing unit has determined that the transmission is engaged in a known predetermined gear ratio, periodically confirming that the transmission is engaged in the predetermined gear ratio (GR) by determining if, within predetermined limits, IS=OS*GR; and if IS does not equal OS*GR, the following steps are then performed:

determining if a ratio (GR±N) close to GR satisfies the expression IS=OS X (GR±N), and (i) if so, inhibiting further ratio changes and signaling a fault and (ii) if not, commanding a shift into a target gear ratio (GR$_T$) satisfying the expression $$OS \cdot GR_T = ES_A$$

and then inhibiting further shifting and signalling a system fault, where:

IS = the value of the input signal indicative of rotational input shaft speed,

OS = the value of the input signal indicative of rotational output shaft speed,

GR = the numerical reduction ratio of the predetermined currently engaged gear ratio; and ES$_A$ = an acceptable engine speed.

2. The method of claim 1 wherein said confirming is accomplished at least once every period of time sufficient for said actuators to respond to said command output signals.

3. The method of claim 2 wherein ES$_A$ is a function of the rate of change of OS with respect to time.

4. The method of claim 1 wherein ES$_A$ is a function of the rate of change of OS with respect to time.

* * * * *